S. TROOD.
MOVABLE ELEMENT FOR ELECTRICAL MEASURING INSTRUMENTS.
APPLICATION FILED FEB. 7, 1913.
1,214,096. Patented Jan. 30, 1917.
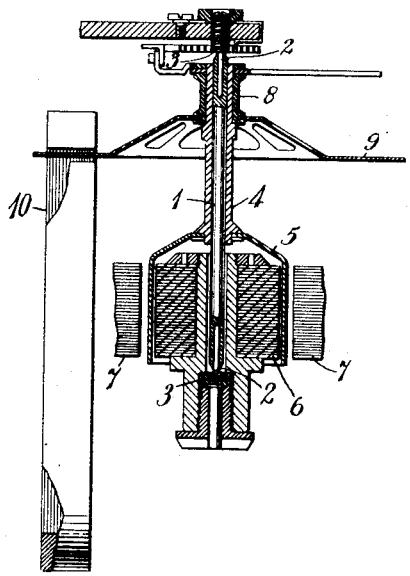
WITNESSES:
Fred H. Miller
Otto J. Schairer
INVENTOR
Samuel Trood
BY
Urley E. Carr
ATTORNEY

UNITED STATES PATENT OFFICE.

SAMUEL TROOD, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOVABLE ELEMENT FOR ELECTRICAL MEASURING INSTRUMENTS.

1,214,096.  Specification of Letters Patent.  Patented Jan. 30, 1917.

Application filed February 7, 1913. Serial No. 746,774.

*To all whom it may concern:*

Be it known that I, SAMUEL TROOD, a citizen of the United States, and a resident of Edgewood Park, in the county of Allegheny and State of Pennsylvania, have invented a new and useful Improvement in Movable Elements for Electrical Measuring Instruments, of which the following is a specification.

My invention relates to electrical measuring instruments and particularly to the movable members thereof, and it has for its object to provide means for mounting the armature and the damping disk of an instrument upon a shaft in such a manner that the shaft, armature and damping disk may be independently detached from the other component parts without disturbing the alined and fixed relations thereof.

In electrical measuring instruments of the induction type, it is customary to employ a cylindrical drum or armature that is mounted for rotation in an annular air gap formed between a cylindrical core and the poles of the actuating magnet, and a conducting disk, mounted upon the same shaft as the armature, and adapted to be rotated thereby between the poles of permanent magnets for the purpose of damping the movements of the rotatable member. In order to obtain accuracy of operation of such an instrument, it is essential that the armature drum and the damping disk be mounted in fixed and definite relation with respect to the adjacent core and magnet parts, and also with respect to each other. It has heretofore been customary to mount the said parts upon the shaft separately and independently, with the result that when it has been desired to remove and replace the shaft on account of wear or injury to the pivots, or for other repairs, it has been necessary to disturb the fixed relations of the armature drum and damping disk, and to readjust the said parts when mounted upon a new shaft. This operation requires the exercise of a high degree of skill and the use of special tools and equipment, and, therefore, cannot be readily practised by the ordinary instrument user.

According to the present invention, the armature drum and damping disk are secured in fixed relation to each other upon an auxiliary sleeve and independently of the shaft, and the shaft may be removed and replaced without disturbing such fixed relations. Not only is this desirable result accomplished by my invention, but I have also arranged the component parts of my device to provide a unitary structure in which any of the various elements are independently removable without disturbing the fixed relationship of the remaining elements. Moreover, while providing a unitary structure embodying all of the above-mentioned features, I further mount the damping disk upon an adjustable hub or collar which is carried by the sleeve that surrounds the shaft. Thus, the relative position of the disk and armature may be adjusted with facility in order that these elements may be properly disposed with respect to each other and to the stationary magnetizable cores of the instrument with which they coöperate, whereby accuracy of operation of the instrument is secured.

My invention is illustrated in the accompanying drawings, the single figure of which is a side and sectional view of a part of an instrument embodying the same.

The movable member of the instrument comprises a one-piece shaft 1 having at its ends hardened pivot pins 2 for which suitable bearings 3 are provided in stationary or fixed parts of the instrument. The shaft 1 is surrounded by a sleeve 4 that is preferably pressed thereon so as to be frictionally secured thereto, though other means for fixedly securing the sleeve to the shaft may be employed if desired. A conducting armature drum 5 is secured to the lower end of the sleeve 4 and is arranged to rotate in an annular air gap formed between a cylindrical core member 6 and poles 7 of the actuating magnet for the instrument. Near its upper end, the sleeve 4 is provided with an adjustable and removable collar or hub 8 that is preferably fixedly secured thereto by frictional engagement, though, if desired, it may be secured thereto in any other suitable manner. The collar or hub 8 carries a disk 9 of conducting material, the outer portions of which rotate between the poles of permanent magnets 10 for the purpose of damping the movements of the movable element of the instrument.

When the armature drum 5 and the damping disk 9 are mounted upon the sleeve 4, they are relatively adjusted through the agency of the adjustable frictionally secured hub 8 so as to rotate properly between the poles of the adjacent magnets, and when once so adjusted, they are maintained in fixed relation by the sleeve 4 which rigidly connects them. It is possible, therefore, to remove and replace the shaft 1 by simply pressing it out of the sleeve 4 and pressing in a new shaft without disturbing the fixed relations of the armature drum and damping disk. This operation may obviously be performed by an ordinary mechanic and without the use of expensive special tools. Moreover, the hub 8 and its associated damping disk 9, as well as the armature 5, may be removed and replaced with equal facility. The shaft, damping disk and armature are, therefore, independently and readily removable for repairs and renewals without the exercise of more than ordinary skill. Only such limitations should be imposed as are indicated in the appended claims.

I claim as my invention:

1. A movable member for electrical measuring instruments comprising a single shaft, a sleeve removably mounted thereon, an armature mounted upon the sleeve, a hub adjustably mounted upon the sleeve and a damping disk carried by the hub.

2. A movable member for electrical measuring instruments comprising a single shaft, a sleeve removably mounted thereon, an armature mounted upon the sleeve, a hub removably mounted upon the sleeve and a damping disk carried by the hub.

3. A movable member for electrical measuring instruments comprising a shaft, a sleeve mounted thereon, an armature mounted upon the sleeve, a hub adjustably mounted upon the sleeve, and a damping disk carried by the hub.

In testimony whereof, I have hereunto subscribed my name this 3rd day of February 1913.

SAMUEL TROOD.

Witnesses:
D. H. MACE,
B. B. HINES.

Copies of this patent may be obtained for five cents each, by addressing the "Commissioner of Patents, Washington, D. C."